United States Patent [19]
Csendes

[11] Patent Number: 6,044,977
[45] Date of Patent: Apr. 4, 2000

[54] METHOD AND APPARATUS FOR REMOVING MICROPARTICULATES FROM A GAS

[76] Inventor: Ernest Csendes, 514 Marquette St., Pacific Palisades, Calif. 90272

[21] Appl. No.: 08/918,469

[22] Filed: Aug. 26, 1997

Related U.S. Application Data

[63] Continuation-in-part of application No. 08/423,326, Apr. 17, 1995, Pat. No. 5,695,130.

[51] Int. Cl.$^7$ .................................................. B07B 9/00
[52] U.S. Cl. .............................. 209/23; 209/29; 209/714; 55/406; 55/408
[58] Field of Search ................................. 209/21, 23, 28, 209/29, 713, 714, 143; 241/5, 19, 162; 55/401, 406, 408

[56] References Cited

U.S. PATENT DOCUMENTS

| | | | |
|---|---|---|---|
| 293,047 | 2/1884 | Mackey | 241/162 X |
| 2,713,977 | 7/1955 | Noll . | |
| 2,738,065 | 3/1956 | Mahlkuch | 209/28 |
| 3,122,399 | 2/1964 | Witzel et al. . | |
| 3,837,483 | 9/1974 | Noll | 209/30 |
| 4,268,294 | 5/1981 | Laughlin et al. | 209/138 X |
| 4,460,393 | 7/1984 | Saget | 209/714 X |
| 4,678,560 | 7/1987 | Stole et al. | 209/23 |
| 5,019,242 | 5/1991 | Donelson | 209/29 |

FOREIGN PATENT DOCUMENTS

| | | | |
|---|---|---|---|
| 1323142 | 7/1987 | U.S.S.R. | 209/29 |

OTHER PUBLICATIONS

"Coal Combustion" Timothy B. DeMoss—PFBC Success Sets Tage for Second Generation Kirk–Itgner "Encyclopedia of Chemical Technology".

"Clean Coal Technology" U.S. Department of Energy, Apr. 1996 Perry's Chemical Engineers Handbook Sixth Edition, McGrawHill Book Co.

*Primary Examiner*—Tuan N. Nguyen
*Attorney, Agent, or Firm*—Edward A. Sokolski

[57] ABSTRACT

A chamber has a drive shaft rotatably mounted therein and extending along substantially the entire longitudinal extent of the chamber. This drive shaft is rotatably driven by a motor at a speed of 1,200–10,000 rpm. A plurality of screens having a mesh of 6–10 mesh are spaced from each other along the longitudinal extent of the chamber in opposing relationship and attached to the drive shaft for rotation therewith. Above the screens are a pair of discs which are attached to the shaft for rotation therewith and longitudinally spaced from each other. First and second similar plates having circular apertures formed therein are fixedly attached to the chamber in longitudinally spaced relationship, the first and second discs being positioned in the apertures of said first and second plates respectively. Gas to be purified is fed into the bottom of the chamber and driven upwardly by a compressor fan attached to the drive shaft. The gas first passes through the rotating screens which comminute and modify the surface characteristics of the microparticulates in the gas and then through circular vortex zones formed between the spinning discs and their opposing plates where the particles are sheared and separated from the gas by centrifugal expelling fans attached to the shaft. Purified gas is fed out from the top of the chamber for utilization in driving a gas turbine or other purpose.

14 Claims, 4 Drawing Sheets

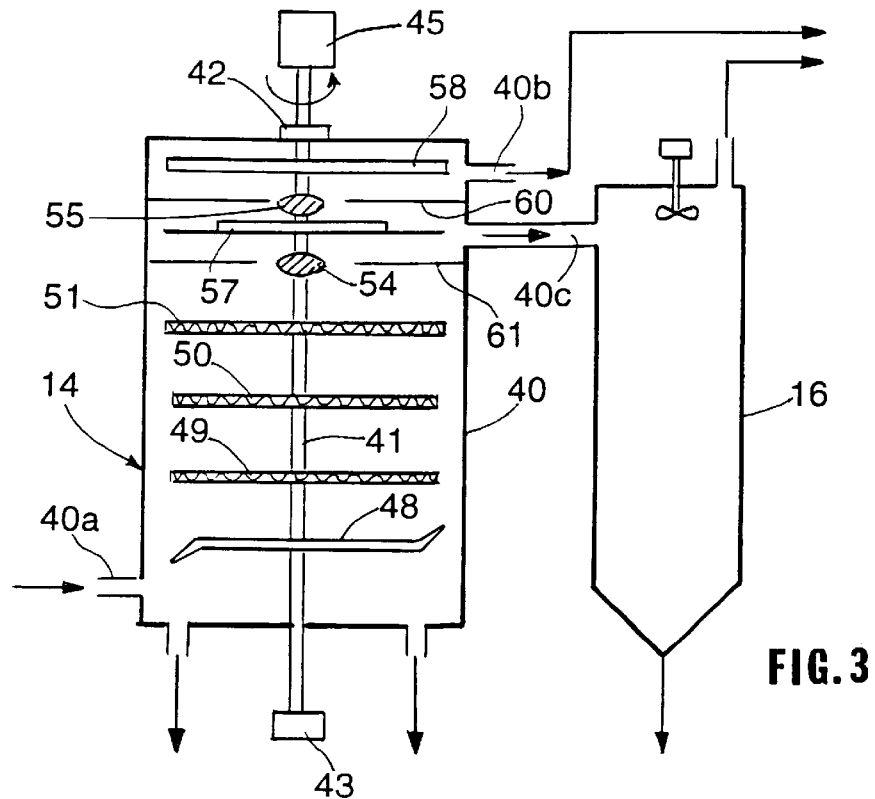
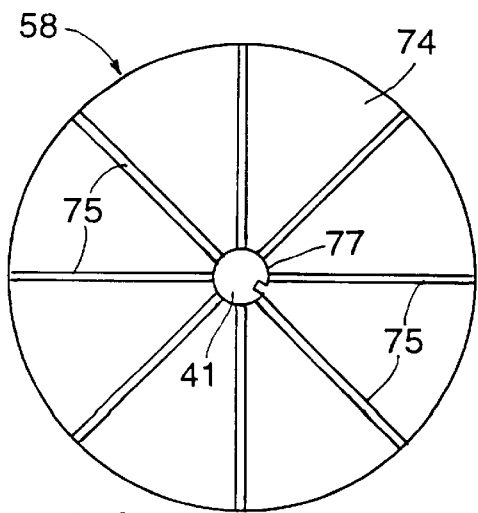
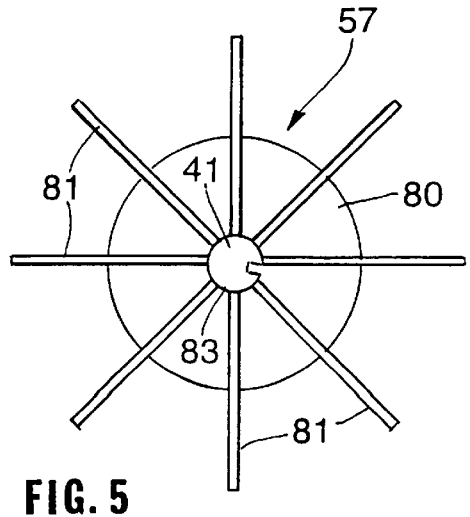

6,044,977

METHOD AND APPARATUS FOR REMOVING MICROPARTICULATES FROM A GAS

This application is a continuation in part of my application Ser. No. 08/423,326 Apr. 17, 1995 filed, now U.S. Pat. No. 5,695,130 for a Method and Apparatus for Dry Grinding of Solids.

BACKGROUND OF THE INVENTION

1. Field of the Invention.

this invention relates to a method and apparatus for removing microparticulates from gas and more particularly to such a method and apparatus which employs rotating screens for comminuting such particles and changing their electrostatic charges in conjunction with spiral vortex zones followed by exposure to centrifugal fans through which the remaining microparticulates are effectively eliminated from the gas.

2. Description of the Related Art.

In advanced electrical power generation systems, fuel gases are generated from raw fuel, these gases being cleaned as best can be done and then combusted to yield expanded combustion gases that are employed to drive a gas turbine. The fuel and combustion gases are generally cleaned from microparticulates by means of high efficiency cyclones which are capable of removing up to 98% of such particles. The remaining 2% of the particles are very difficult to remove due to their small size, electrostatic charges and flocculating tendencies. These residual microparticulates which are generally composed of ash or char can seriously damage the turbine blades resulting in inefficiency of operation and downtime for repair as well as the expense of such repair. It is therefore highly desirable to effectively remove such residual microparticulates.

In the September, 1995 edition of Power Engineering magazine in an article on Coal Combustion(pages 15 and 20, a pressurized fluidized bed combustor is described which employs crushed coal and sorbent for generating gases for driving a gas turbine. Particles are removed from the gas in this system by means of a series of cyclones which removes about 98% of the particulate material. An attempt is made in this system to remove the remaining 2% of the particulate material by passing the gas through ceramic candles(ceramic candle batteries). While the ceramic candles are useful in removing some of the particulate material they have cleaning problems and often break down and fail. This approach also has the disadvantage of requiring high temperature, high pressure filters which generally have limited operating lives.

In my application Ser. No. 08/423,326 of which the present application is a continuation in part, a grinding system is described in which rotating screens with wide mesh openings are first used to comminute the material through spiral vortexes and such comminuted material is then fed to circular vortexes formed between rotating discs and stationary plates where the final grinding of the particulate material is accomplished and the final comminuted material is separated from the gas streams by centrifugal fans. The system and method of the present invention applies some of the technology of my prior art patent application in implementing the separation of the microparticulate material from the fuel gas.

SUMMARY OF THE INVENTION

The device and method of the present invention involves the employment of a series of high speed rotating screens to form vertical spiral vortexes for comminuting particulate material contained in gas to be purified in conjunction with a series of high speed rotating discs which are located in circular apertures in stationary plates forming circular vortex zones. In these spiral vortexes, the particles are reduced in size considerably and electrostatic charges eliminated therefrom so that the remaining particles can readily be cleared out of the gas by high speed centrifugal fans.

In implementing the above indicated operation, a chamber having inlets near the bottom thereof and outlets near the top has a drive shaft running from the bottom to the top. The drive shaft is driven at high speeds(1,200–10,000 rpm) by means of a drive motor. The gas to be purified is fed into an inlet at the bottom end of the chamber and driven by a compressor fan connected to the drive shaft through a series of relatively wide mesh rotating screens(6–10 mesh) The particles in the gas are comminuted by the vertical spiral vortexes generated by the high speed screens so that after passing through the screens they are substantially reduced in size and altered in surface characteristics.

The particles are then passed through a first circular vortex zone formed in the space formed between a high speed rotating disc which is driven by the shaft and a plate which is fixedly supported on the walls of the chamber. The plate has a circular aperture at its center within which the disc is located. The high speed circular vortex further comminutes the particles reducing their size considerably and also removing electrostatic charges therefrom, thereby facilitating their removal from the gas. A high speed centrifugal fan connected to the drive shaft is positioned directly above this first circular vortex zone and drives a portion of the particles along with some of the gas out of the chamber into a cyclone. After this portion of the gas has been cleaned in the cyclone, it exits as purified gas at the top of the cyclone, the impurities and some of the gas exiting at the bottom of the cyclone for recycling.

The gas with remaining small particles is fed to a second circular vortex zone formed by a second rotating disc and a second fixed plate similar to the first, where these remaining particles are further comminuted. Finally the purified gas is driven out of the top of the chamber by a high speed centrifugal fan connected to the drive shaft, this gas being processed in conventional fashion for use in driving a gas turbine.

It is therefore an objection of this invention to lessen the danger of blade damage to gas driven turbines.

It is a further object of this invention to provide an improved method and apparatus for more effectively removing particulate material from a gas.

Other objects of the invention will become apparent in view of the following description taken in connection with the accompanying drawings.

DESCRIPTION OF THE DRAWINGS

FIG. 3 is an elevational cutaway view illustrating a preferred embodiment of the invention;

FIG. 4 is a top plan view of one of the centrifugal expelling fans used in the preferred embodiment;

FIG. 5 is a top plan view illustrating a second centrifugal expelling fan used in the preferred embodiment;

DETAILED DESCRIPTION OF THE INVENTION

Figure 1:
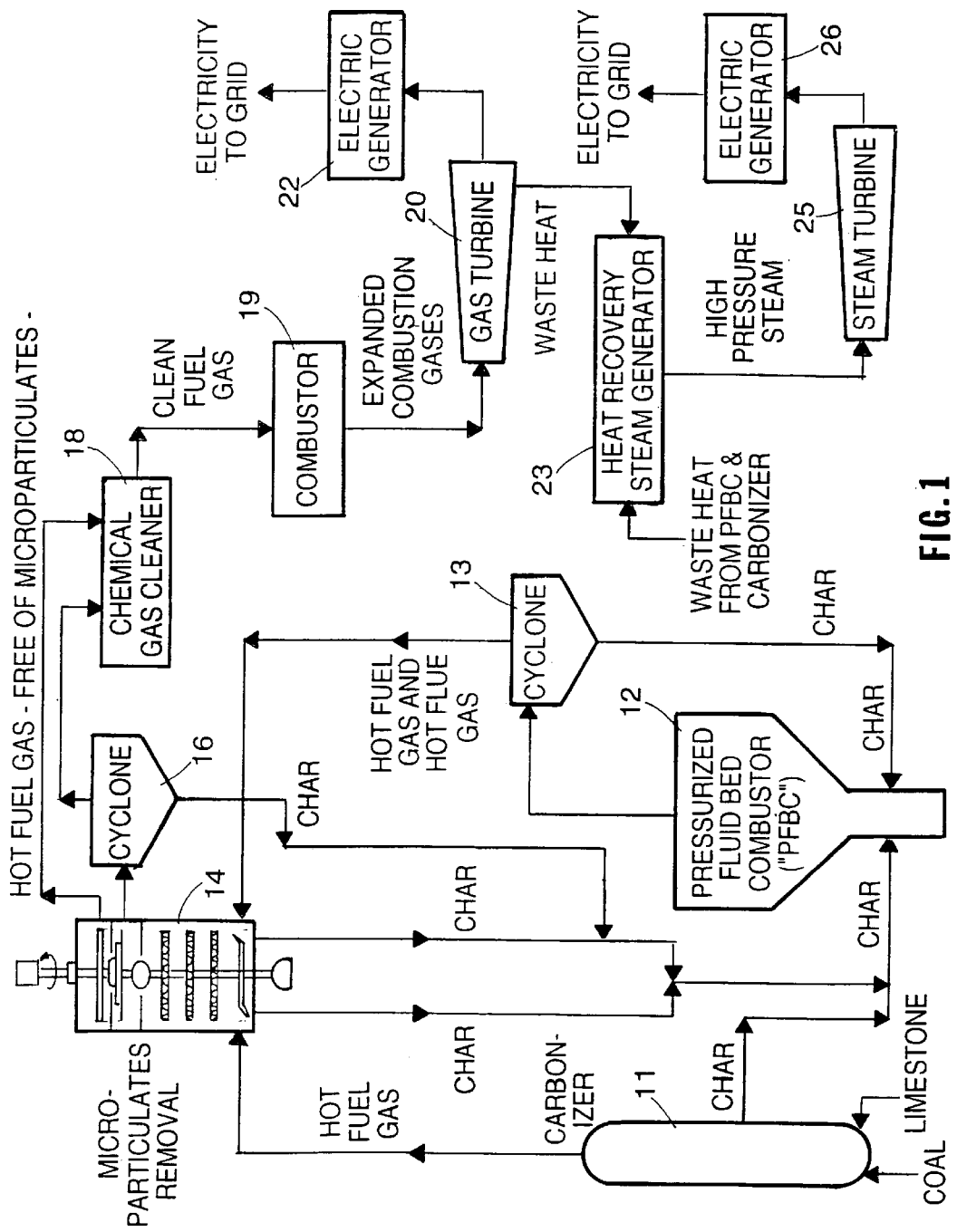
FIG. 1 is a schematic drawing illustrating the use of the device of the invention in providing a purified gas for driving a gas turbine in conjunction with a pressurized fluid bed combustor.

Referring now to FIG. 1, a system using combustion gases for driving a gas turbine which incorporates the device of the invention is schematically illustrated. Other than for the microparticulate remover of the present invention, this type of system is well known in the art.

Pieces of coal and limestone are fed to carbonizer 11 which converts this material into hot fuel gases and char, the char being fed to a pressurized fluid bed combustor 12 which generates fuel gases and flue gases from the char. The flue and hot fuel gases generated by the pressurized fluid bed combustor are fed to cyclone 13 wherein most particles remaining in the fuel gases are moved. The gases from the carbonizer 11 and from cyclone 13 which generally only have micropariculates remamaining in the fuel gases are fed to microparticulate remover 14 wherein the novel aspects of the invention lie. The microparticulates remaining in the gases are effectively removed in microparticulate remover 14, as to be explained further on in the description. Portions of the gases in which the microparticulates have been comminuted and stripped of electrostatic charges are fed to cyclone 16 by the high speed centrifugal fan. Gases having larger char particles are recycled from the bottom of the microparticulate remover to fluid bed combustor 12. Hot fuel gases generated in carbonizer 11 and having microparticulates therein are fed from the top of the carbonizer as an input to microparticulate remover 14.

The output of microparticuate remover 14 is fed from the top end thereof to chemical gas cleaner 18, the cleaned gas output of which is fed to combustor 19. Gas cleaner 18 removes sulfur and other chemical impurities from the gas. Gases from the top end of cyclone 16 which do not have microparticulates are also fed as an input to the cleaner. The gases are expanded in the combustor, and the expanded gas output of the combustor is used to drive gas turbine 20 which in turn drives electric generator 22. As already noted, the gas used to drive the turbine is essentially particulate free so that damage to the turbine blades is minimized. Waste heat from gas turbine 20 is fed to heat recovery steam generator 23 which generates high pressure steam which is used to drive steam turbine 25 which in turn drives electric generator 26. Waste heat recovered from the carbonizer 11 and from pressurized fluid bed combustor 12 is also fed into heat recovery generator 23 and processed.

Figure 2:
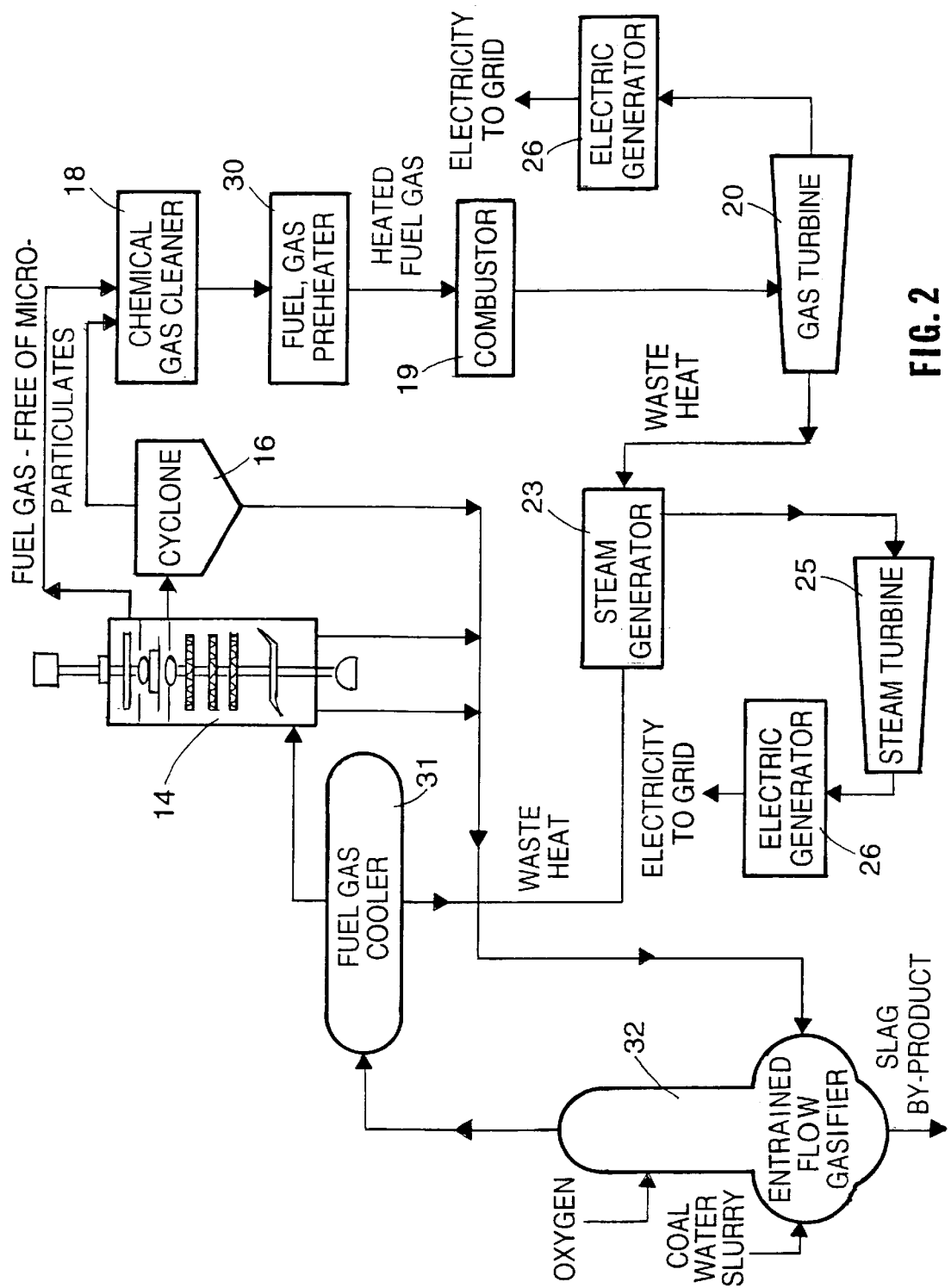
FIG. 2 is a schematic drawing illustrating the use of the device of the invention in a second type of gas turbine drive system in conjunction with a coal gasification unit.

Referring now to FIG. 2, a system employing coal gasification which incorporates the present invention therein is schematically illustrated. This system is similar to that described in connection with FIG.1, except for the use of the coal gasifier and the components associated therewith. The same numerals are therefore used to identify corresponding components, and only the portions of the system which differ by virtue of the entrained coal gasifier will be described.

Coal gasifier 32, which is a device well known in the art, is fed a coal-water slurry and oxygen which is heated to high temperature to gasify the coal. The gas output of the gasifier is fed to fuel gas cooler 31 to suitably lower its temperature for utilization as an input to microparticulate remover 14. Heat in cooler 31 is used to generate steam in steam generator 23 for driving steam turbine 25. Also, in this system, a fuel gas preheater 30 is employed between chemical gas cleaner 18 and combustor 19. Otherwise, operation is the same as previously described in connection with FIG. 1.

Referring now to FIGS. 3,4,5,6, and 8, a preferred embodiment of the invention is illustrated.

Shaft 41 is mounted for rotation at the center of cylindrical chamber 40 on bearings 42 and 43. The shaft is driven at high speed(1200–10,000 rpm) by means of motor 45. Mounted on shaft 41 for rotation therewith(going from bottom to top) are a generally circular compressor fan 48; three spaced apart similar rotating screen assemblies 49–51, as shown in FIG. 6; a pair of spaced apart discs 54 and 55; a first expelling fan 57 located between the discs, shown in FIG. 5; and a second expelling fan 58 located near the top of the chamber, shown in FIG. 4.

Figure 8:
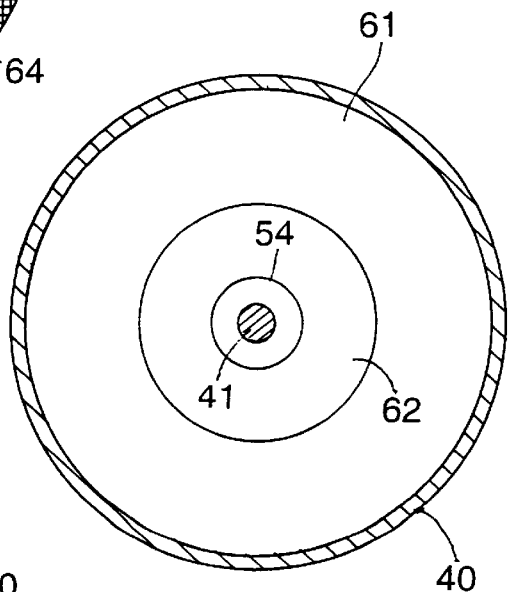
FIG. 8 is a top plan view illustrating the fixed plate and rotation disc of the preferred embodiment.

Fixedly attached to the inner wall of the chamber are a pair of similar circular plates 60 and 61, as shown in FIG. 8. Discs 54 and 55 are positioned in the center of an aperture formed in the center of each of plates, as shown in FIG. 8.

Figure 6:
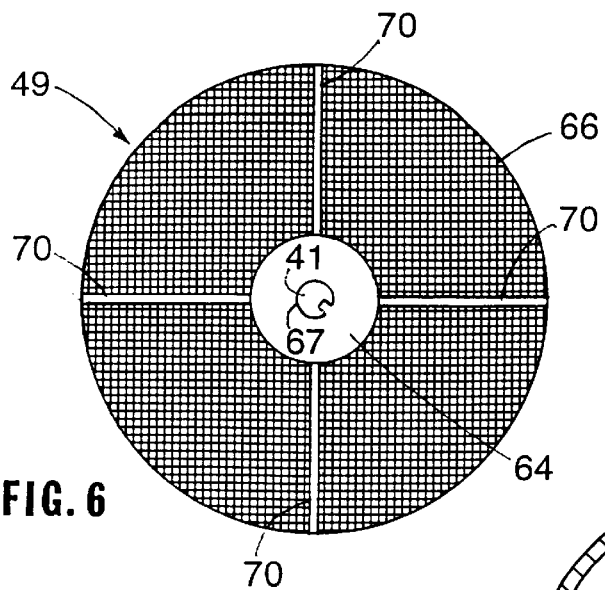
FIG. 6 is a top plan view of the screen assembly used in the preferred embodiment.

Referring now to FIG. 6, a top plan view of one of the screen assemblies 49 is shown, It is to be noted that all of the screen assemblies 49–51 are the same. The screens in these assemblies have relatively wide mesh openings(preferably 6–10 mesh). The screens are welded both to a holding ring 66 and to a central deflector disc 64 which are both preferably of steel. The disc 64 is welded to central hub 67 which has a keyway formed therein which is attached through a key(not shown) to shaft 41. A fastening shaft collar(not shown) supports this keyway attachment. Reinforcing rods 70 are welded to the screen to prevent excessive vibration thereof which might be occasioned by the high speed rotation of the screen and the hot gas flow therethrough.

Referring now to FIG. 4 a bottom plan view of the centrifugal expelling fan 58 located at the top of the chamber is shown. Disc 74, which is preferably of steel has a plurality of radial vanes 75 welded thereto which extend upwardly from the top surface thereof. A central hub 77 having a keyway formed therein attaches through a key(not shown) to the drive shaft 41 thereby connecting the disc thereto.

Referring not to FIG. 5, a bottom plan view of the lower expelling fan 57 is shown. Disc 80, which is preferably of steel has a plurality of radial vanes 81 welded thereto and extending upwardly from the surface of the disc. A hub 83 at the center of the disc has a keyway formed therein which attaches through a key(not shown) to drive shaft 41.

Referring now to FIG. 8, a top plan view of the lowermost spinning disc 54 and stationary plate 61 forming the lower circular vortex zone is illustrated. It is to be noted that the uppermost spinning disc and stationary plate forming the upper circular vortex zone are the same as the lowermost. Plate 61, which may be of steel is fixedly attached to the inner wall of chamber 40 by suitable means such as a screw attachment to holding platelets which are welded to the inner wall of the chamber. Circular aperture 62 is formed in the center of plate 61. Disc 54 is located the center of aperture 62 and is connected to shaft 41 by suitable means such as a keyway in the central hub at the center of the disc which attaches through a key to the shaft.

Figure 7:
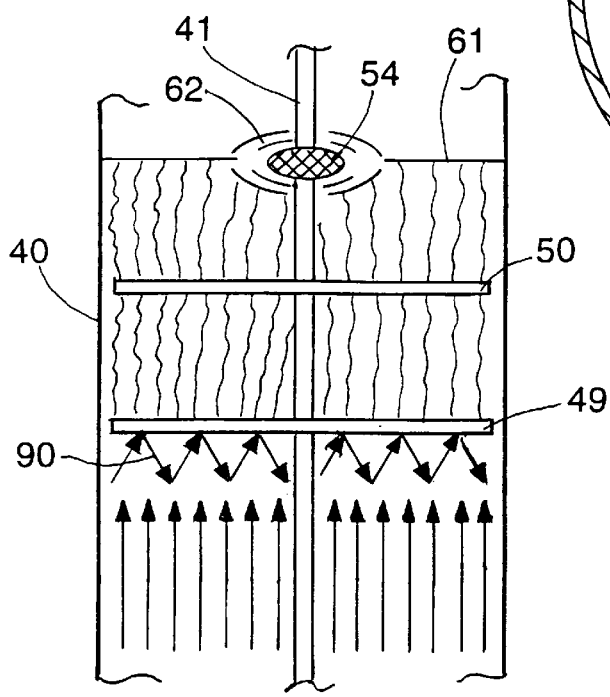
FIG. 7 is a schematic drawing illustrating the operation of the spiral vortex mechanism of the preferred embodiment.

Referring now to FIGS. 3 and 7, the operation of the device of the invention is as follows: Hot pressurized gases(up to 25" water column with a velocity of 2,000–7,000 ft/min) are fed into chamber 40 through inlet 40*a*. Compressor fan 48 drives these gases to the high speed rotating screens 49–51. The slower moving larger diameter particles in the gases are repulsed, as indicated by arrows 90 and drop down for recycling as previously described. The smaller faster moving particles which pass through the screens enter air erosion zones created by powerful spiral vortexes above each of the screens 49 and 50. The particles thereafter pass into the circular vortex zones created in the aperture 62 between spinning disc 54 and stationary plate 61. After passing through both circular vortex zones created in the apertures surrounding spinning discs 54 and 55, the particles are conveyed by the gases to centrifugal expelling fan 58 where they are pushed out of the gas stream. The purified hot gases are fed out of the chamber through outlet 40*b* for utilization, as already described. The gases still having remaining particles are passed out of the chamber through outlet 40*c* for recycling, as previously described.

While the invention has been described and illustrated in detail, it is to be clearly understood that this is intended by way of illustration and example only and not by way of limitation, the scope of the invention being only by the terms of the following claims.

I claim:

1. A device for removing microparticulates from a gas stream to provide a purified gas output for use in driving a gas turbine comprising:

screen means;

means for rotatably driving said screen means to form a spiral vortex thereabove;

means for passing said gas stream through said screen means to comminute the microparticulates therein and modify the surface characteristics thereof;

a plate having a circular aperture formed therein;

means for fixedly supporting said plate;

a circular non-apertured disc mounted in said aperture, there being a space between said disc and said plate;

means for rotating said disc to form a circular vortex zone in said space between the disc and the plate;

means for passing the comminuted gas from said screen means to said circular vortex zone whereat the microparticulates in the gas are sheared;

expelling fan means for separating said microparticulates from the gas; and means for feeding the gas from the vortex zone to a location for use in driving a gas turbine.

2. The device of claim 1 wherein said screen means comprises a plurality of 4–60 mesh screens.

3. The device of claim 1 wherein said screen means is rotated at 1,200–10,000 rpm.

4. The device of claim 2 wherein said screen means is rotated at 1,200–10,000 rpm.

5. The device of claim 1 and further including a second plate having an aperture formed therein, means for fixedly supporting said second plate in a position spaced from the first plate between the first plate and the screen means, a second disc mounted in said aperture, there being a space between said second disc and said second plate, means for rotatably driving said second disc to form a second circular vortex zone between said second disc and said second plate, and means for recycling the gas from said second vortex zone back through said screen means.

6. A device for removing microparticulates from a gas stream to provide a purified gas output comprising:

a chamber having a plurality of inlets near one end thereof and a plurality of outlets near the other end thereof;

a drive shaft rotatably mounted in said chamber;

means for rotatably driving said drive shaft;

a plurality of screens connected to said drive shaft for rotation therewith, said screens being spaced from each other in opposing relationship;

a compressor fan connected to said shaft for rotation therewith, said compressor fan being positioned in said chamber between said screens and said inlets for driving the gas from which the microparticulates are to be removed from a first one of said inlets through said screens;

first and second discs connected to said shaft for rotation therewith, said discs being spaced from each other along said shaft and positioned between said screens and said outlets;

first and second plates fixedly attached to said chamber in positions opposite said first and second discs respectively, said plates having circular apertures formed therein in which the discs are located, a circular space being formed between each of said plates and its associated disc, a vortex zone being formed in said circular space when said discs are rotated by said shaft;

first and second centrifugal fans connected to said shaft for rotation therewith, said first fan being positioned between said first and second discs and opposite a first one of the outlets of said chamber to drive unpurified gas therethrough, said second fan being positioned between both of said discs and the other end of said chamber and opposite a second one of the outlets of the chamber to drive purified gas therethrough; and means for feeding the unpurified gas stream output of said first one of said outlets to a first one of the inlets of said chamber for recycling.

7. The device of claim 6 wherein the means for feeding the unpurified gas stream comprises a cyclone for separating out particulate material from the gas stream.

8. The device of claim 6 wherein the shaft is rotated at a speed of 1,200–10,000 rpm.

9. The device of claim 6 wherein the mesh of the screens is 6–10 mesh.

10. The device of claim 8 wherein the mesh of the screens is 6–10 mesh.

11. A method for removing microparticulates from a gas stream comprising the steps of:

feeding said gas stream through a circular vortex zone formed in a space between a spinning non-apertured disc and a fixed plate, said plate having a circular aperture in which said disc is located; and driving the gas stream from said vortex zone to a desired location for utilization.

12. A method for removing microparticulates from a gas stream to provide a purified gas output comprising the steps of:

blowing said gas stream through one or more rotating screens to comminute the microparticulates and modify their surface characteristics;

feeding the gas stream which has passed through said rotating screens to a first circular vortex zone formed between a first non-apertured rotating disc and a fixed plate having a circular aperture in which the disc is positioned;

passing the gas stream which has passed through the first circular vortex zone to a second circular vortex zone formed between a second non-apertured rotating disc and a second plate having a circular aperture in which the disc is positioned;

driving a portion of the gas stream which still has microparticulates therein from said first vortex zone back through said rotating screens for recycling; and feeding the gas stream from said second vortex zone to a location for use as a purified gas which can be utilized in driving a gas turbine.

13. The method of claim 12 wherein the gas stream from said first vortex zone is fed for recycling through a cyclone to said rotating screens.

14. The method of claim 13 wherein the screens and discs are rotated at a speed of 1,200–10,000 rpm.

* * * * *